US012215997B2

United States Patent
Lintzgy et al.

(10) Patent No.: US 12,215,997 B2
(45) Date of Patent: Feb. 4, 2025

(54) ULTRASONIC DISTANCE SENSOR AND A METHOD FOR PROTECTING AN ULTRASONIC TRANSDUCER IN AN ULTRASONIC DISTANCE SENSOR

(71) Applicant: Rochester Sensors, LLC, Coppell, TX (US)

(72) Inventors: Martin Robert Lintzgy, Scarriff (IE); Martin Joseph Callanan, Feakle (IE); Peter Anthony McCarthy, Ardnacrusha (IE)

(73) Assignee: Rochester Sensors, LLC

( * ) Notice: Subject to any disclaimer, the term of this patent is extended or adjusted under 35 U.S.C. 154(b) by 268 days.

(21) Appl. No.: 17/733,208

(22) Filed: Apr. 29, 2022

(65) Prior Publication Data
US 2022/0349742 A1 Nov. 3, 2022

(30) Foreign Application Priority Data
Apr. 30, 2021 (IE) .................................... 2021/0097

(51) Int. Cl.
*G01F 23/296* (2022.01)
*G01F 23/2962* (2022.01)

(52) U.S. Cl.
CPC ...... *G01F 23/2968* (2013.01); *G01F 23/2962* (2013.01)

(58) Field of Classification Search
CPC .................. G01F 23/2968; G01F 23/2962
(Continued)

(56) References Cited

U.S. PATENT DOCUMENTS 4,000,650 A 1/1977 Snyder
4,130,018 A 12/1978 Adams et al.
(Continued)

FOREIGN PATENT DOCUMENTS

DE 9209977 U1 11/1992
DE 102017107331 A1 10/2018
(Continued)

OTHER PUBLICATIONS

Communication pursuant to Article 94(3) EPC in EP Application No. 22170309.3-1001; dated Aug. 1, 2024.

*Primary Examiner* — Luke D Ratcliffe
*Assistant Examiner* — Christopher Richard Walker
(74) *Attorney, Agent, or Firm* — Howard IP Law Group; Edward J. Howard (57) ABSTRACT

An ultrasonic level sensor (1) for monitoring the level of a liquid in a vessel comprises a main housing (3) having a lower part (5) and an upper part (6). An ultrasonic transducer (19) having an output face (25), through which ultrasonic signals are transmitted and received is housed in a sub-housing (39) located in an engagement recess (17) in the lower part (5). A communicating aperture (24) accommodates ultrasonic signals transmitted by the ultrasonic transducer (19) to and from the liquid surface, the level of which is to be monitored. The sub-housing (39) comprises a cylindrical side wall (40) extending upwardly from a protective element (35) for protecting the ultrasonic transducer (19). The protective element (35) comprises a circular disc of resilient material impermeable to corrosive gases and vapours in the vessel, the liquid level of which is being monitored, and comprises a central working portion (48) of diameter similar to that of the output face (25), and an outer peripheral portion (49) extending around the central working portion (48) of thickness greater than the thickness of the central working portion (48). The central working portion
(Continued)

(48) is of constant thickness of approximately 0.35 mm and in its relaxed state is convex when viewed from the ultrasonic transducer (19), and is deformable into a planar configuration to abut and vibrate in unison with the output face (25) of the ultrasonic transducer (19) to minimise attenuation of the ultrasonic signals.

20 Claims, 4 Drawing Sheets (58) Field of Classification Search
USPC .................................. 367/908; 73/290 V
See application file for complete search history.

(56) References Cited

U.S. PATENT DOCUMENTS

| | | |
|---|---|---|
| 4,637,463 A | 1/1987 | McCoy |
| 5,363,341 A | 11/1994 | Schwald et al. |
| 5,697,248 A | 12/1997 | Brown |
| 5,737,963 A | 4/1998 | Eckert et al. |
| 5,866,815 A | 2/1999 | Schwald et al. |
| 6,536,275 B1 | 3/2003 | Durkee et al. |
| 8,218,396 B2 * | 7/2012 | Holcomb ............. G21C 17/035 367/908 |
| 10,072,963 B1 * | 9/2018 | Solokhin ............... G01F 23/296 |
| 10,107,671 B2 * | 10/2018 | Niemann .................. G01K 7/02 |
| 2004/0007061 A1 | 1/2004 | Forgue |
| 2004/0136271 A1 | 7/2004 | Gluszyk |
| 2004/0182149 A1 | 9/2004 | Balin et al. |
| 2007/0261487 A1 * | 11/2007 | Sintes ................. G01F 23/2962 73/290 V |
| 2012/0320713 A1 | 12/2012 | Mueller et al. |
| 2016/0178426 A1 | 6/2016 | Gurumohan et al. |
| 2019/0310126 A1 * | 10/2019 | Gurumohan ............ H04Q 9/00 |
| 2019/0368915 A1 * | 12/2019 | Carter ................ G01F 23/2968 |
| 2020/0249070 A1 | 8/2020 | Gurumohan et al. |

FOREIGN PATENT DOCUMENTS

| | | |
|---|---|---|
| GB | 1336847 A | 11/1973 |
| JP | H05231888 A | 9/1993 |

* cited by examiner

ULTRASONIC DISTANCE SENSOR AND A METHOD FOR PROTECTING AN ULTRASONIC TRANSDUCER IN AN ULTRASONIC DISTANCE SENSOR

FIELD OF THE INVENTION

The present invention relates to an ultrasonic distance sensor, and in particular, though not limited to an ultrasonic distance sensor for use in a vessel for determining the level of the contents stored therein. The invention also relates to a method for protecting an ultrasonic transducer in an ultrasonic distance sensor, and the invention also relates to a protective element for use in the ultrasonic distance sensor.

BRIEF DESCRIPTION OF THE PRIOR ART

Ultrasonic level sensors are commonly used for monitoring the level of a liquid in a vessel or for monitoring the level of a granular, particulate or powder material in a vessel where such granular, particulate or powder materials have fluid like flow characteristics. Such ultrasonic level sensors comprise a housing in which an ultrasonic transducer is housed. The housing is mounted on the top of the vessel, the level of the contents of which is to be monitored. A portion of the housing extends into the vessel adjacent the top thereof, through which the ultrasonic transducer is exposed to the interior of the vessel. The ultrasonic transducer periodically transmits a burst of ultrasonic signals to the surface of the liquid or other material, the level of which is to be determined. The ultrasonic transducer then waits to receive echo signals of the burst of ultrasonic signals reflected from the surface of the contents of the vessel, the level of which is being monitored. The level of the surface is then determined based on the time of flight of the burst of ultrasonic signals from the time the burst is transmitted until the echo signals are received. Such ultrasonic level sensors, in general, produce an accurate indication of the level of the contents of a vessel.

However, a problem arises with such ultrasonic level sensors in cases where the liquid or other material contents of the vessel, the level of which is to be monitored, comprise corrosive or hazardous liquids or materials. In general, such corrosive or hazardous liquids or other materials emit corrosive and hazardous gases, vapours or other media, which can have a corrosive and detrimental effect on the housing of the ultrasonic level sensor, and more importantly, can have a corrosive and detrimental effect on the ultrasonic transducer itself. While in general, it is possible to address any corrosion problems with the housing by providing the housing of a material resistant to the corrosive or hazardous material without significantly attenuating the ultrasonic signals transmitted by the ultrasonic transducer, it is not possible to protect the ultrasonic transducer without significantly attenuating the signals both transmitted and received by the ultrasonic transducer.

There is therefore a need for an ultrasonic level sensor which addresses this problem, and there is also a need for an ultrasonic distance sensor which addresses the problem.

The present invention is directed towards providing an ultrasonic distance sensor, and an ultrasonic level sensor which addresses the problem. The invention is also directed towards a protective element for use in an ultrasonic distance sensor for protecting an ultrasonic transducer therein, which also addresses the problem.

Additionally, the invention is directed towards a method for protecting an ultrasonic transducer of an ultrasonic distance sensor from a corrosive or hazardous environment.

SUMMARY OF THE INVENTION

According to the invention there is provided an ultrasonic distance sensor comprising a main housing for housing an ultrasonic transducer therein, the main housing having a communicating aperture for accommodating a transmitted signal from the ultrasonic transducer therethrough, and a protective element protecting the ultrasonic transducer from a corrosive or hazardous environment into which the signal from the ultrasonic transducer is to be transmitted, the protective element being adapted to have a minimal attenuating effect on the transmitted signal.

In one embodiment of the invention the maximum attenuating effect of the protective element on the transmitted signal does not exceed 70% of the strength of the transmitted signal. Preferably, the maximum attenuating effect of the protective element on the transmitted signal does not exceed 50% of the strength of the transmitted signal, and advantageously, does not exceed 20% of the strength of the transmitted signal, and ideally, the maximum attenuating effect of the protective element on the transmitted signal is less than 5% of the strength of the transmitted signal.

In one embodiment of the invention the maximum attenuating effect of the protective element on the transmitted signal lies in the range of 5% to 30% of the strength of the transmitted signal.

In one embodiment of the invention the protective element is located in or adjacent the communicating aperture.

In another embodiment of the invention the protective element is adapted to close the communicating aperture in the main housing, and advantageously, is adapted to sealably close the communicating aperture in the main housing.

In one embodiment of the invention the protective element comprises a central working portion adapted to accommodate the transmitted signal from the ultrasonic transducer therethrough.

Preferably, an outer peripheral portion extends around the central working portion of the protective element, and advantageously, the outer peripheral portion of the protective element extends completely around the central working portion.

In another embodiment of the invention the central working portion of the protective element comprises a membrane, and preferably, a membrane of a semi-rigid material.

In another embodiment of the invention the central working portion of the protective element comprises a membrane of a resiliently bendable material, which preferably, is resiliently bendable from a relaxed state, and preferably, the central working portion of the protective element comprises a resiliently bendable disc.

In one embodiment of the invention the central working portion of the protective element is of thickness in the range of 0.01 mm to 1 mm, and preferably, the thickness of the central working portion of the protective element lies in the range of 0.1 mm to 0.6 mm, and advantageously, the thickness of the central working portion of the protective element lies in the range of 0.2 mm to 0.4 mm, and ideally, the thickness of the central working portion of the protective element is approximately 0.35 mm.

In another embodiment of the invention the central working portion of the protective element comprises a first major surface, and a second major surface opposite to the first major surface, the first major surface being adapted to be adjacent the ultrasonic transducer, and advantageously, adjacent an output face of the ultrasonic transducer from which the transmitted signal is transmitted.

Preferably, the first major surface of the central working portion of the protective element is adapted to abut the output face of the ultrasonic transducer, and advantageously, to tightly abut the output face of the ultrasonic transducer.

In another embodiment of the invention the central working portion of the protective element in its relaxed state is of arcuate shape, and preferably, is of dish shape.

In another embodiment of the invention the first major surface of the central working portion of the protective element in its relaxed state defines a convex surface, and preferably, the output face of the ultrasonic transducer abuts the first major surface of the protective element adjacent the centre of convexity thereof.

In another embodiment of the invention the ratio of the depth of convexity of the first major surface of the central working portion of the protective element in the relaxed state between the centre of the first major surface of the central working portion of the protective element and the outer peripheral edge of the first major surface of the central working portion to the maximum width dimension of the central working portion through the centre thereof lies in the range of 1:70 to 1:33, and preferably, is approximately 1:48.

In another embodiment of the invention the central working portion of the protective element is deformable from its relaxed state in response to pressure applied to the centre of the first major surface thereof, and preferably, the central working portion of the protective element is deformable from its relaxed state in response to pressure applied to the centre of the first major surface thereof to reduce the depth of convexity of the first major surface.

In another embodiment of the invention the central working portion of the protective element is deformable from its relaxed state in response to the pressure applied to the centre of the first major surface thereof for reducing the depth of convexity of the first major surface by at least 25% thereof.

In another embodiment of the invention the central working portion of the protective element is deformable from its relaxed state in response to the pressure applied to the centre of the first major surface thereof for reducing the depth of convexity of the first major surface by at least 50% thereof.

In another embodiment of the invention the central working portion of the protective element is deformable from its relaxed state in response to the pressure applied to the centre of the first major surface thereof for reducing the depth of convexity of the first major surface by at least 75% thereof.

In another embodiment of the invention the central working portion of the protective element is deformable from its relaxed state in response to the pressure applied to the centre of the first major surface thereof for reducing the depth of convexity of the first major surface by at least 95% thereof.

In another embodiment of the invention the central working portion of the protective element is deformable from its relaxed state in response to the pressure applied to the centre of the first major surface thereof for reducing the depth of convexity of the first major surface to the extent that the first major surface becomes substantially planar.

In one embodiment of the invention the central working portion of the protective element defines a substantially circular outer periphery.

Preferably, the central working portion of the protective element is of substantially constant thickness.

In one embodiment of the invention the central working portion of the protective element transitions into the outer peripheral portion thereof through a flexion zone extending around the central working portion between the central working portion and the outer peripheral portion of the protective element. Preferably, the flexion zone is adapted to permit flexing of the central working portion of the protective element relative to the outer peripheral portion thereof during transmission of the signal transmitted from the ultrasonic transducer, and preferably, to permit the central working portion of the protective element to vibrate with the output face of the ultrasonic transducer during transmission of the ultrasonic signal from the ultrasonic transducer, and advantageously, to vibrate in unison with the output face of the ultrasonic transducer during transmission of the ultrasonic signal therefrom.

In another embodiment of the invention the flexion zone is of annular shape extending completely around the central working portion of the protective element.

In one embodiment of the invention the flexion zone of the protective element is of substantially similar thickness to the thickness of the central working portion of the protective element.

In another embodiment of the invention the flexion zone defines a first major surface and an opposite second major surface, and preferably, the second major surface of the flexion zone lies in a common plane with the second major surface of the central working portion of the protective element, when the central working portion of the protective element is planar.

In another embodiment of the invention the first major surface of the flexion zone of the protective element lies in a common plane with the first major surface of the central working portion when the first major surface of the central working portion is planar.

In another embodiment of the invention the radial width of the flexion zone between the central working portion and the outer peripheral portion of the protective element is not greater than 2 mm, and preferably, the radial width of the flexion zone lies in the range of 0.5 mm to 2 mm. Advantageously, the radial width of the flexion zone lies in the range of 1 mm to 1.75 mm, and preferably, the flexion zone is of radial width of approximately 1.5 mm.

In one embodiment of the invention the outer peripheral portion of the protective element is of thickness greater than the thickness of the central working portion thereof.

In another embodiment of the invention the outer peripheral portion of the protective element defines a first major surface and a second major surface. Preferably, the second major surface of the outer peripheral portion of the protective element lies in a common plane with the second major surface of the central working portion of the protective element when the second major surface of the central working portion is planar.

In another embodiment of the invention the first major surface of the outer peripheral portion of the protective element transitions into the one of the first major surface of the central working portion and the first major surface of the flexion zone through a transition step. Preferably, the transition step extends circumferentially around and from the first major surface of the outer peripheral portion. Advantageously, the transition step defines an inclined surface, inclining relative to the first major surface of the outer peripheral portion. Advantageously, the transition step diverges outwardly from the one of the first major surface of the central working portion and the first major surface of the flexion zone towards the first major surface of the outer peripheral portion.

Preferably, the transition step diverges outwardly from the one of the first major surface of the central working portion and the first major surface of the flexion zone towards the first major surface of the outer peripheral portion at an angle to the first major surface of the one of the central working portion and the flexion zone in the range of 100° to 150°, and advantageously, at an angle in the range of 115° to 135°, and ideally, at an angle of approximately 120°.

In another embodiment of the invention a support structure is provided for supporting the protective element.

Preferably, the support structure comprises a sub-housing, which advantageously, is engageable with the main housing.

In one embodiment of the invention the sub-housing defines with the protective element a chamber for accommodating the ultrasonic transducer therein, and preferably, the chamber defined by the sub-housing defines the outer transverse cross-section of the ultrasonic transducer for snugly and/or tightly engaging the ultrasonic transducer therein.

In another embodiment of the invention the protective element defines a base of the hollow interior region of the sub-housing.

In another embodiment of the invention the sub-housing comprises a peripheral wall extending around the protective element, and preferably, the peripheral wall extends around the outer peripheral edge of the outer peripheral portion of the protective element. Advantageously, the peripheral wall of the sub-housing defines with the protective element the hollow interior region.

Preferably, the peripheral wall of the sub-housing is configured to tightly engage the ultrasonic transducer therein.

In another embodiment of the invention the main housing defines an engagement recess for accommodating the sub-housing therein. Preferably, the engagement recess is configured to tightly engage the peripheral wall of the sub-housing therein.

In another embodiment of the invention the engagement recess terminates in the communicating aperture.

In a further embodiment of the invention a tubular member having a communicating bore extending therethrough extends from the main housing, and preferably, the communicating bore communicates with the engagement recess through the communicating aperture for accommodating the signal from the ultrasonic transducer therethrough.

In one embodiment of the invention the communicating bore extending through the tubular member diverges outwardly from the communicating aperture.

In one embodiment of the invention the transverse cross-sectional area of the communicating bore adjacent the communicating aperture is substantially similar to the area of the communicating aperture.

In one embodiment of the invention the communicating aperture is of circular shape, and preferably, the communicating bore is of circular transverse cross-section.

In another embodiment of the invention the diameter of the communicating bore adjacent the communicating aperture is substantially equal to the diameter of the communicating aperture.

Preferably, the communicating aperture and the communicating bore define a common central axis.

In another embodiment of the invention the area of the central working portion of the protective element is substantially similar to the area of the communicating aperture.

In another embodiment of the invention the protective element is of a circular shape and preferably, the central working portion of the protective element is of circular shape, and advantageously, the diameter of the central working portion of the protective element is substantially equal to the diameter of the communicating aperture.

Preferably, the central working portion of the protective element and the communicating aperture define a common central axis.

In another embodiment of the invention the area of the central working portion of the protective element is substantially similar to the area of an output face of the ultrasonic transducer from which the ultrasonic signals are transmitted.

In one embodiment of the invention the output area of the ultrasonic transducer is of circular shape. Preferably, the diameter of the central working portion of the protective element is substantially equal to the diameter of the output face of the ultrasonic transducer, and advantageously, the output face of the ultrasonic transducer defines a common central axis with the central working portion of the protective element.

Preferably, the protective element comprises a material resistant to the corrosive or hazardous environment into which the signal from the ultrasonic transducer is to be transmitted.

Advantageously, the protective element comprises a material impermeable to the corrosive or hazardous environment into which the signal from the ultrasonic transducer is to be transmitted.

In one embodiment of the invention the protective element comprises polyvinylidene fluoride material.

In another embodiment of the invention the protective element comprises polyvinylidene difluoride material.

In one embodiment of the invention the sub-housing comprises polyvinylidene fluoride material.

In another embodiment of the invention the sub-housing comprises polyvinylidene difluoride material.

In one embodiment of the invention the ultrasonic distance sensor is adapted to monitor the level of the contents of a vessel.

In another embodiment of the invention the main housing comprises a first part, at least a portion of which is adapted for locating in the vessel in which the level of the contents thereof is to be monitored, and a second part adapted for locating in an external environment external of the vessel.

In one embodiment of the invention the first part and the second part of the main housing are connected together, and preferably, are sealably connected together, and advantageously, releasably connected. Alternatively, the first and second parts of the main housing are non-releasably connected together.

Preferably, the communicating aperture is provided in the first part of the main housing.

In a further embodiment of the invention a communicating means is provided in the main housing for communicating with the ultrasonic transducer.

In one embodiment of the invention the communicating means comprises a wireless communicating means, and preferably, the communicating means comprises an antenna.

Alternatively, the communicating means comprises an electrically conductive cable for hardwiring into the main housing. Preferably, an access opening is provided in the main housing for accommodating the cable therethrough, and advantageously, a sealing means is provided for sealing the cable in the access opening.

Advantageously, the access opening is provided in the second part of the main housing.

In one embodiment of the invention at least the portion of the first part of the main housing comprises a material resistant to the corrosive or hazardous environment in the vessel, and preferably, the first part of the main housing comprises the material resistant to the corrosive or hazardous environment in the vessel.

In another embodiment of the invention the first part of the main housing comprises a material similar to the material of the protective element.

In another embodiment of the invention the second part of the main housing comprises a material which is the same or different to the material of the protective element, and in one embodiment of the invention the second part of the main housing is of a material which is not resistant to the environment within the vessel.

In another embodiment of the invention the main housing is adapted for fitting in a sensor accommodating opening in the vessel, and advantageously, for sealably fitting in the sensor accommodating opening in the vessel.

The invention also provides the protective element for use in the ultrasonic distance sensor according to the invention, the protective element being adapted to protect the ultrasonic transducer thereof from a corrosive or hazardous environment into which a signal from the ultrasonic transducer is to be transmitted.

Further the invention provides the sub-housing comprising the protective element mounted therein.

Additionally, the invention provides a method for protecting an ultrasonic transducer of a distance measuring sensor, the distance measuring sensor comprising a main housing and an ultrasonic transducer located in the main housing, the main housing having a communicating aperture therein for accommodating a transmitted signal from the ultrasonic transducer therethrough, the method comprising providing a protective element protecting the ultrasonic transducer from a corrosive or hazardous environment into which the signal from the ultrasonic transducer is to be transmitted, and adapting the protective element to have a minimal attenuating effect on the transmitted signal.

In one embodiment of the invention the protective element is located in or adjacent the communicating aperture.

Advantages of the Invention

The advantages of the invention are many. A particularly important advantage of the invention is that it provides an ultrasonic distance sensor which is suitable for use in corrosive and hazardous environments. The ultrasonic distance sensor according to the invention may be used in corrosive and hazardous environments without risk of corrosion or other damage to the ultrasonic transducer, while the attenuation of ultrasonic signals transmitted by the ultrasonic transducer is minimised, as is the attenuation of echo signals reflected to the ultrasonic transducer also minimised. In fact, it has been found that the attenuation of the transmitted ultrasonic signals and the reflected echo signals, in general, does not exceed 30% of the strength of the transmitted ultrasonic signals, and similarly, of the reflected echo signals. In general, the attenuation of the transmitted ultrasonic signals does not exceed 20% of the strength of the transmitted signals, and also of the strength of the reflected echo signal received by the ultrasonic transducer. Indeed, in some embodiments of the invention it has been found that the attenuation of the transmitted ultrasonic signals is less than 5% of the strength of the transmitted ultrasonic signals, and also is less than 5% of the strength of the reflected echo signals received by the transducer. These advantages are largely achieved by the provision of the protective element according to the invention.

The advantages achieved by the method according to the invention are similar to those achieved by the ultrasonic distance transducer.

BRIEF DESCRIPTION OF THE DRAWINGS

The invention will be more clearly understood from the following description of a preferred embodiment thereof which is given by way of example only with reference to the accompanying drawings, in which.

DETAILED DESCRIPTION OF THE INVENTION

Figure 1:
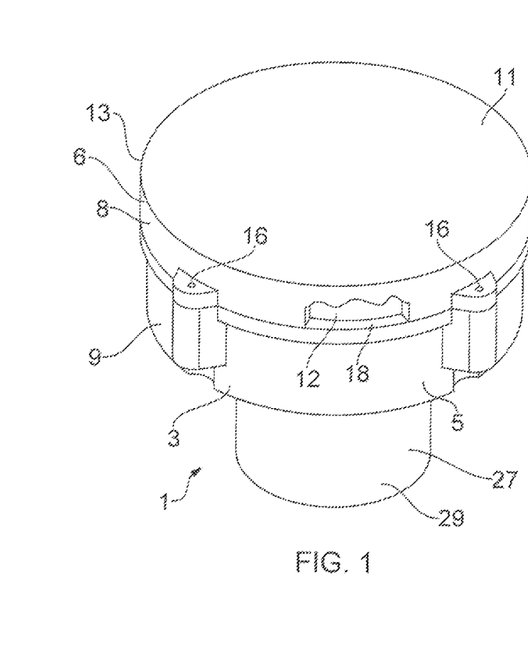
FIG. 1 is a partly cut-away perspective view of an ultrasonic distance sensor according to the invention.

Referring to the drawings there is illustrated an ultrasonic distance sensor according to the invention indicated generally by the reference numeral 1. In this embodiment of the invention the ultrasonic distance sensor is adapted as a level sensor 1 for mounting on a vessel for monitoring the level of the contents in the vessel, for example, monitoring the level of a liquid stored in a vessel, or for monitoring the level of particulate material, for example, grain or other such granular or particulate type materials as well as powder materials in a vessel. Neither the vessel nor the contents thereof are illustrated. Such ultrasonic level sensors for monitoring the level of the contents in a vessel will be well known to those skilled in the art, and further description of the vessel or the contents thereof should not be required.

The level senor 1 comprises a main housing 3, which is formed in two parts, namely, a first part, which forms a lower part 5 of the main housing, and a second part which forms an upper part 6 of the main housing 3. The lower part of the main housing comprises a base wall 7 and a cylindrical outer side wall 9 extending around and upwardly from the periphery 10 of the base wall 7. The upper part 6 of the main housing 3 comprises a cylindrical outer side wall 8 of similar diameter to that of the cylindrical outer side wall 9 of the lower part 5. An upper end cap 11 closes an upper end 13 of the cylindrical outer side wall 8 of the upper part 6 of the main housing 3. The upper part 6 of the main housing 3 together with the lower part 5 thereof define a main hollow interior region 12. The upper part 6 of the main housing 3 is releasably secured to the lower part 5 thereof by screws (not shown) through bores 16 in the upper part 6 which engage threaded bores 14 formed in the lower cylindrical side wall 9 of the lower part 5. An O-ring seal 18 located in an annular groove 15 extending around the lower cylindrical side wall 9 of the lower part 5 forms a watertight seal between the lower part 5 and the upper part 6 of the main housing 3.

An engagement recess 17 is formed in the main hollow interior region 12 in the lower part 5 of the main housing 3 for accommodating an ultrasonic transducer 19 therein.

The ultrasonic transducer 19 is located in the engagement recess 17, as will be described below, to transmit ultrasonic signals directed towards the top surface of the contents of the vessel and to receive the echo signals reflected from the surface of the contents of the vessel, in order to determine the level of the contents in the vessel as will be well known to those skilled in the art. The engagement recess 17 is defined by a cylindrical inner side wall 20 extending upwardly from a base 22. A communicating aperture 24 is formed centrally in the base 22 of the engagement recess 17, and is of circular shape having an area substantially similar to the area of an output face 25 of the ultrasonic transducer 19, through which ultrasonic signals from the ultrasonic transducer 19 are transmitted and received. The communicating aperture 24 is located in the base 22 of the engagement recess 17, so that when the ultrasonic transducer 19 is located in the engagement recess 17, as will be described in more detail below, the output face 25 of the ultrasonic transducer 19 is centrally aligned with the communicating aperture 24, so that the communicating aperture 24 accommodates the signals transmitted by the ultrasonic transducer 19 therethrough, as well as echoed signals reflected from the surface of the contents of the vessel to the ultrasonic transducer 19.

A tubular member 27 extends downwardly from the base wall 7 of the lower part 5 of the main housing 3 and comprises an outer cylindrical wall 29 extending downwardly from the base 7 of the lower part 5, and an inner wall 30 extending downwardly from and defining the base 22 of the engagement recess 17. The inner wall 30 defines a communicating bore 32 of circular transverse cross-section which extends from the base wall 22 around the peripheral edge of the communicating aperture 24, and communicates with the ultrasonic transducer 19 through the communicating aperture 24 for accommodating signals transmitted by the ultrasonic transducer 19 into the vessel and the echoed signals reflected from the surface of the contents of the vessel to the ultrasonic transducer 19. The diameter of the communicating bore 32 where it terminates in the base 22 of the engagement recess 17 is substantially similar to the diameter of the communicating aperture 24. The communicating bore 32 of the tubular member 27 diverges outwardly from the communicating aperture 24 and defines a parabolic reflecting surface 31 which defines a focal point 33. The focal point 33 substantially coincides with the output face 25 of the ultrasonic transducer 19, so that the ultrasonic signals produced by the ultrasonic transducer 19 are directed to the top surface of the contents of the vessel as a substantially parallel beam of ultrasonic signals, and the echo signals from the top surface of the contents of the vessel are focussed by the parabolic reflecting surface 31 at the output face 25 of the ultrasonic transducer 19.

Compartments 34 are formed in the main hollow interior region 12 in the lower part 5 of the main housing 3 for accommodating electronic circuitry for controlling and communicating with the ultrasonic transducer 19, and for determining the time of flight of each burst of ultrasonic signals transmitted by the ultrasonic transducer 19 from the time of transmission to the time of reception of the echoed signals, and for determining the level of the contents in the vessel from the time of flight of the ultrasonic signals. Such electronic circuitry will be well known to those skilled in the art.

Figure 2:
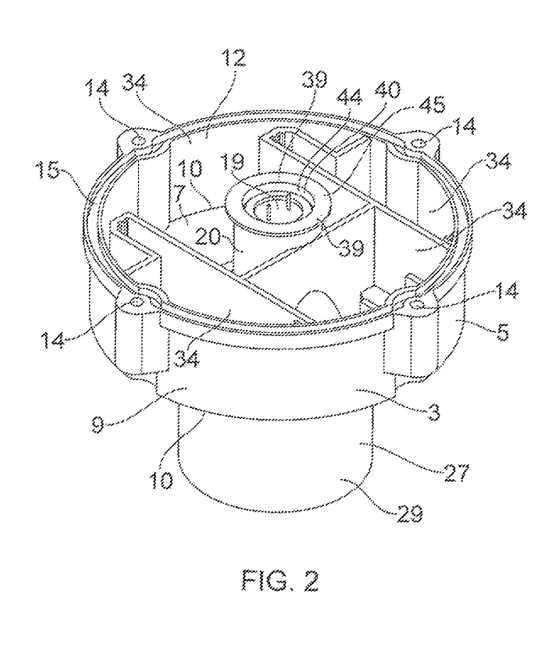
FIG. 2 is a perspective view of a portion of the ultrasonic distance sensor of FIG. 1.
Figure 3:
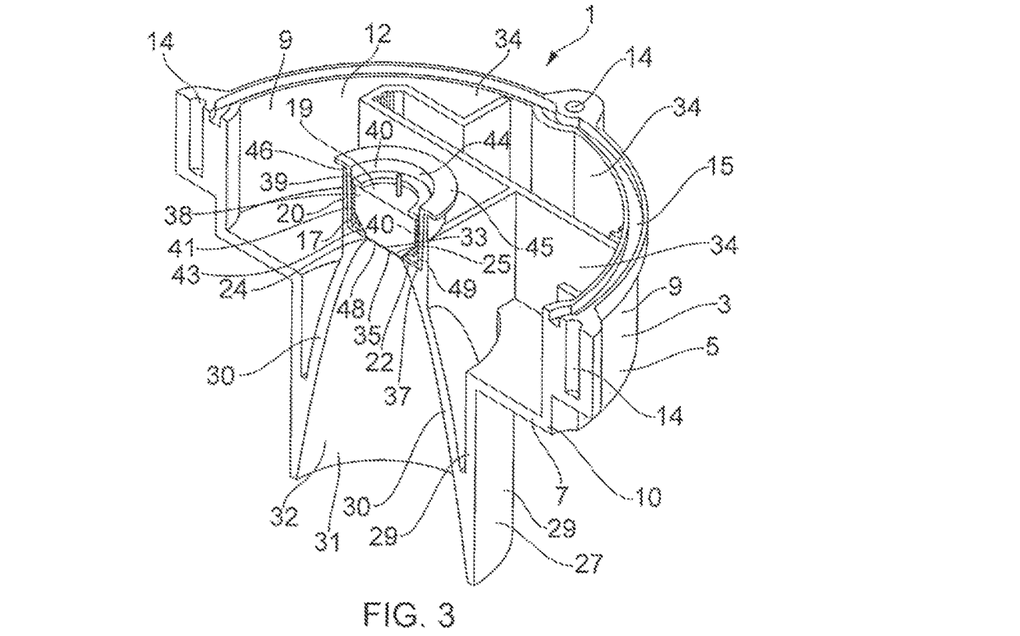
FIG. 3 is a cutaway cross-sectional perspective view of the portion of the ultrasonic distance sensor of FIG. 1.

Turning now to the mounting of the ultrasonic transducer 19 in the engagement recess 17, a protective element 35 also according to the invention is located in the engagement recess 17 adjacent the base 22 thereof, and in turn adjacent the communicating aperture 24 for protecting the ultrasonic transducer 19, and in particular the output face 25 thereof from a corrosive, a hazardous or other environment which may exist in the vessel on which the level sensor 1 is mounted for monitoring the level of the contents therein. In this embodiment of the invention the protective element 35 comprises a membrane of a material resistant to and impermeable to the corrosive or hazardous gases or vapours in the corrosive or hazardous environment from which the ultrasonic transducer 19 is to be protected, for example, in the vessel into which signals from the ultrasonic transducer 19 are to be transmitted for sensing the level of the contents therein. The protective element 35 is of disc shape and defines a circular outer periphery 37, and is supported by a support structure which is provided in the form of a sub-housing 39. The sub-housing 39 is tightly and securely engaged in the engagement recess 17.

The sub-housing 39 comprises a peripheral cylindrical side wall 40 which extends around and perpendicularly upwardly from the outer periphery 37 of the protective element 35. The protective element 35 forms a base of the sub-housing 39, and with the cylindrical side wall 40 defines a cylindrical chamber 44 within which the ultrasonic transducer 19 is located. In this case the ultrasonic transducer 19 comprises a cylindrical body portion 38 tapering at 43 to the output face 25 thereof.

The ultrasonic transducer 19 is located in and surrounded by a sleeve 41 of a vibration absorbing material in order to minimise transmission of vibrations produced by the ultrasonic signals into the sub-housing 39, and in turn into the main housing 3. The sleeve 41 comprises a rubber material, and is provided with a plurality of spaced apart ribs 42 extending circumferentially around an outer surface thereof. The chamber 44 is of diameter such that the ribs 42 of the sleeve 41 of the ultrasonic transducer 19 are tightly engaged in the chamber 44 of the sub-housing 39 by the cylindrical side wall 40 thereof. The cylindrical side wall 40 is of outer diameter such that the cylindrical side wall 40 is tightly engaged in the engagement recess 17 by the cylindrical inner side wall 20 thereof. A flange 45 extends circumferentially around and radially outwardly from the cylindrical side wall 40, and is engageable with an upper end 46 of the cylindrical inner wall 20 of the engagement recess 17.

Figure 9:
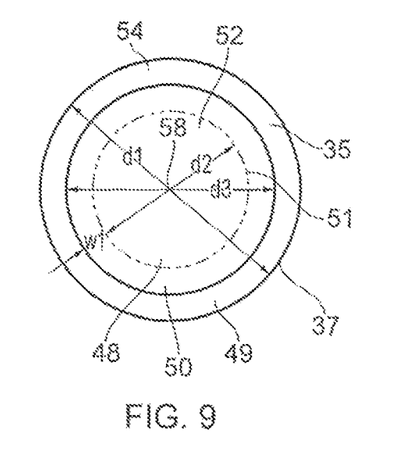
FIG. 9 is a top plan view of a portion of the detail of FIG. 7 of the ultrasonic distance sensor of FIG. 1.

Turning now in more detail to the protective element 35, the protective element 35 comprises a central working portion 48 of circular shape, and an outer peripheral portion 49 extending outwardly from and circumferentially around the central working portion 48. The outer peripheral portion 49 of the protective element 35 defines the outer periphery 37 of the protective element 35 from which the cylindrical side wall 40 extends upwardly and perpendicularly therefrom. An annular flexion zone 50 of annular shape extends completely around the central working portion 48 between the central working portion 48 and the outer peripheral portion 49 in order to permit flexing of the central working portion 48 relative to the outer peripheral portion 49 in response to signals being transmitted from the output face 25 of the ultrasonic transducer 19. The flexion zone 50 is illustrated in FIG. 9 delineated from the central working portion 48 by a chain-dotted line 51.

Figure 4:
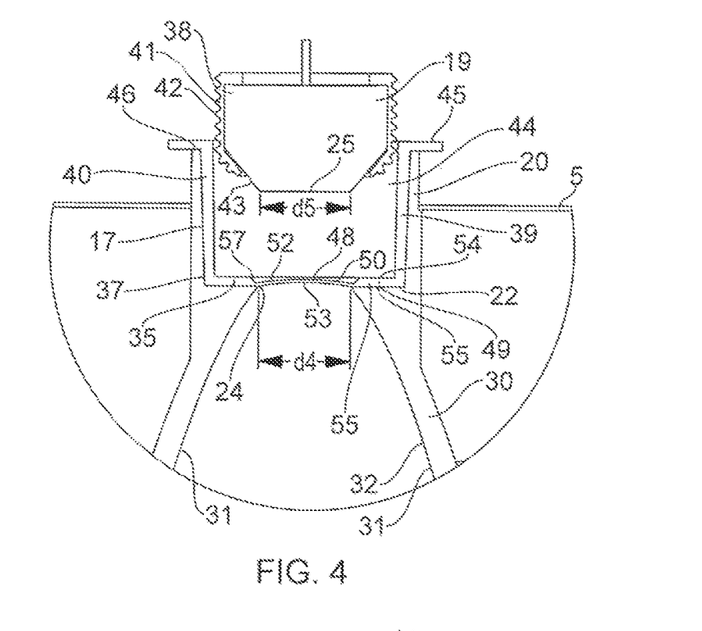
FIG. 4 is a cross-sectional side elevational view of a detail of the ultrasonic distance sensor of FIG. 1 illustrating the ultrasonic distance sensor of FIG. 1 being assembled.
Figure 5:
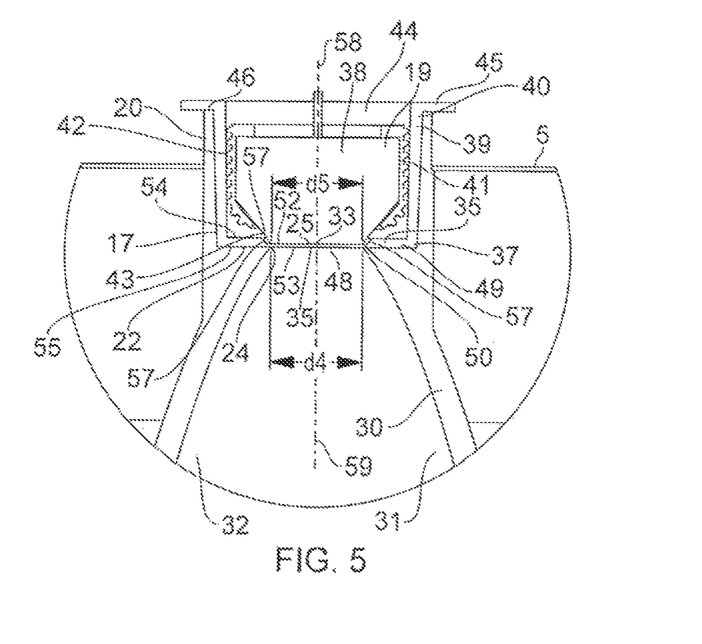
FIG. 5 is a view similar to FIG. 4 of the detail of FIG. 4 illustrating a further state of the assembly of the ultrasonic distance sensor of FIG. 1.
Figure 7:
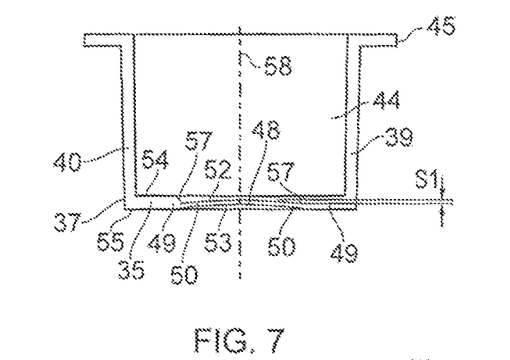
FIG. 7 is a cross-sectional side elevational view of another detail of the ultrasonic distance sensor of FIG. 1.
Figure 8:
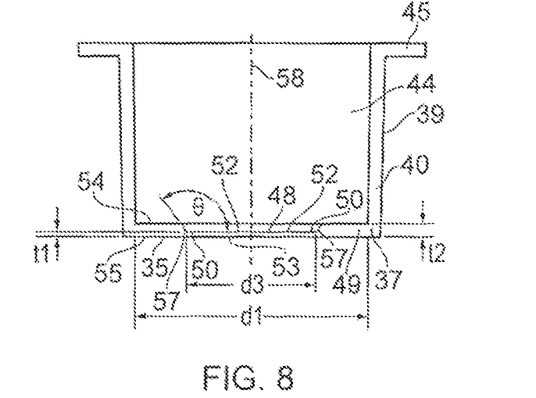
FIG. 8 is a view similar to FIG. 7 of the detail of FIG. 7 of the ultrasonic distance sensor of FIG. 1 in a different state to that of FIG. 7.

In this embodiment of the invention the central working portion 48 and the flexion zone 50 define a first major surface 52 and an opposite second major surface 53, with the first major surface 52 of the central working portion 48 abutting the ultrasonic transducer 19, and the second major surface 53 facing towards the communicating bore 32 in the tubular member 27. The central working portion 48 and the flexion zone 50 in their relaxed state are of dish shape, see FIGS. 4 and 7, with the first major surface 52 being convex when viewed from the side of the ultrasonic transducer 19, and the second major surface 54 being concave when viewed from the communicating bore 32 in the tubular member 27. The protective element 35 as will be described in more detail below is of a resilient material, and the central working portion 48 and the flexion zone 50 are deformable from the relaxed dish shape into a planar state illustrated in FIGS. 5 and 8 by the ultrasonic transducer 19 when it is in the chamber 44, and urged downwardly into the chamber 44 with the output face 25 thereof in tight abutting engagement with the first major surface 52 of the central working portion 48, so that the central working portion 48 of the protective element 35 and the output face 25 of the ultrasonic transducer 19 are effectively mechanically coupled together, in order to minimise attenuation of the ultrasonic signal and echo signals thereof as they pass through the central working portion 48 from and to the output face 25 of the ultrasonic transducer 19.

Figure 6:
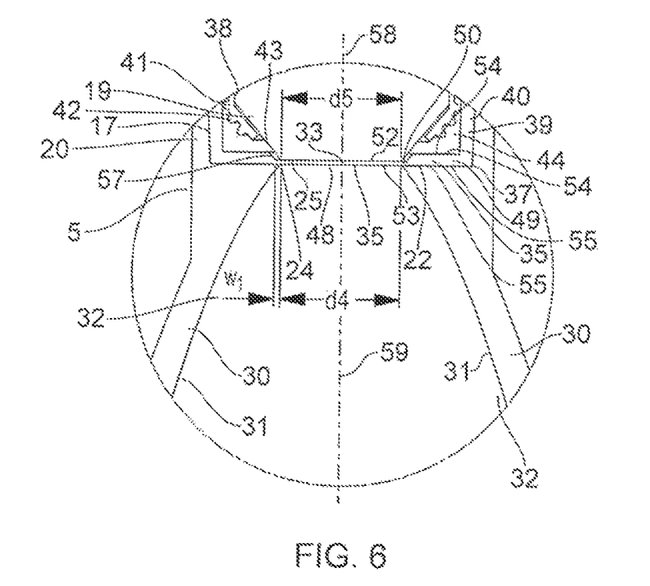
FIG. 6 is an enlarged cross-sectional view of a part of the detail of FIG. 5 of the ultrasonic distance sensor of FIG. 1.

The central working portion 48 and the flexion zone 50 are of the same constant thickness $t_1$ between the first and second major surfaces 52 and 53 of approximately 0.35 mm. The outer peripheral portion 49 of the protective element 35 defines a first major surface 54 and a second opposite major surface 55, and is of thickness $t_2$ between the first and second major surfaces 54 and 55, which is greater than the thickness $t_1$ of the central working portion 48 and the flexion zone 50. In this case, the thickness $t_2$ of the outer peripheral portion 49 is approximately 1.0 mm. The second major surface 55 of the outer peripheral portion 49 of the protective element 35 lies in a common plane with the second major surface 53 of the central working portion 48 and the flexion zone 50 when the central working portion 48 and the flexion zone 50 are planar. The first major surface 54 of the outer peripheral portion 49 transitions to the first major surface 52 of the flexion zone 50 through an inclined transition step 57, which extends circumferentially around the flexion zone 50. The inclined transition step 57 diverges outwardly from the first major surface 52 of the flexion zone 50 to the first major surface 54 of the outer peripheral portion 49 at an angle θ of approximately 120° to the first major surface 54 of the flexion zone 50, when the flexion zone 50 is planar. Although, it will be appreciated that the angle θ may be of other suitable values other than 120°. It is envisaged that the angle θ may lie in the range of 100° to 150° but preferably would lie in the range of 115° to 135° The diameter $d_1$ of the outer periphery 42 of the protective element 35, in this embodiment of the invention is approximately 20 mm. The outer peripheral diameter $d_2$ of the central working portion 48 is approximately 8.0 mm. The outer diameter $d_3$ of the flexion zone 50 is approximately 11.0 mm. The diameter chi of the communicating aperture 24 is approximately 8.0 mm, which in this embodiment of the invention is similar to the diameter $d_2$ of the central working portion 48. However, the inner surface of the base 22 of the engagement recess 17, which abuts the second major surfaces 53 and 55 of the protective element 35, is bevelled around the communicating aperture 24 to permit flexing of the flexion zone 50. The diameter $d_5$ of the output face 25 of the ultrasonic transducer 19 is also 8.0 mm, which is the same as the diameter $d_2$ of the central working portion 48. The radial width $w_1$ of the flexion zone 50 in this embodiment of the invention is approximately 1.5 mm. The protective element 35, including the central working portion 48, the outer peripheral portion 49 and the flexion zone 50, as well as the output face 25 of the ultrasonic transducer 19 all define a common central axis 58 which coincides with a common central axis 59 defined by the communicating aperture 24 and the communicating bore 32, and on which the focal point 33 defined by the parabolic reflecting surface 31 of the tubular member 27 lies.

The depth $s_1$ of the convexity of the first major surface 52 of the flexion zone 50 and the central working portion 48 when both are in the relaxed dish shape state in this embodiment of the invention is approximately 0.23 mm, and since the outer diameter $d_3$ of the flexion zone 50 is approximately 11.0 mm, the ratio of the convexity of the first surface 52 of the central working portion 48 and the flexion zone 50 in the relaxed state thereof to the outer diameter $d_3$ of the flexion zone 50 is approximately 1:48.

The material of the protective element 35 and the sub-housing 39 may be any suitable material, which is capable of protecting the ultrasonic transducer 19 from the environment in the vessel, the level of the contents thereof is being monitored, be it a corrosive, hazardous or other environment, and furthermore, is sufficiently flexible and resilient, so that the central working portion 48 vibrates in unison with the output face 25 of the ultrasonic transducer 19. However, in this embodiment of the invention the material of the protective element 35 and the sub-housing 39 is polyvinylidene fluoride. Although, in some embodiments of the invention the protective element 35 and the sub-housing 39 may be of polyvinylidene difluoride. Needless to say, other suitable materials may be used, for example, mylar, and other materials capable of protecting the ultrasonic transducer 19 against the relevant environment and/or are impermeable to and preferably, resistant to corrosive or hazardous gases, vapours or other media in the corrosive, hazardous or other environment.

Additionally, in this embodiment of the invention the protective element 35 and the sub-housing 39 are integrally formed in once piece by injection moulding, although, in other embodiments of the invention, it is envisaged that the protective element and the sub-housing may be formed independently of each other and subsequently secured together, by, for example, friction or heat welding, or indeed, the protective element may be bonded to the sub-housing by a suitable adhesive.

It has been found that by providing the flexion zone 50 between the central working portion 48 and the outer peripheral portion 49, and by providing the central working portion 48 and the flexion zone 50 of thickness $t_1$ of approximately 0.35 mm, and of diameters as described above, with the central working portion 48 of the protective element 35 mechanically coupled to the output face 25 of the ultrasonic transducer 19, the central working portion 48 vibrates in unison with the output face 25 of the ultrasonic transducer 19 during transmission of the ultrasonic signals therefrom, and during reception of the echoed signals received by the ultrasonic transducer. Thereby attenuation of signals being transmitted by the ultrasonic transducer 19 and the echo signals being received by the ultrasonic transducer 19 through the central working portion 48 of the protective element 35 is minimised. It has been found that the attenuation resulting from the provision of the protective element 35 does not exceed 30% of the original strength of the signal transmitted by the ultrasonic transducer 19 through the central working portion 48 of the protective element 35, and in this embodiment of the invention with the central working portion 48 dimensional as discussed above, it has been found that the attenuation of the signal by the central working portion 48 is approximately 5% of the original strength of the signal transmitted by the ultrasonic transducer 19. It has been found that by inclining the transition step 57 between the first major surface 52 of the flexion zone 50 and the first major surface 54 of the outer peripheral portion 49 of the protective element 35, the stresses induced in the flexion zone 50 resulting from vibration of the central working portion 48 with the output face 25 of the ultrasonic transducer 19 are minimised, thereby avoiding rupturing of the protective element 35 in the flexion zone 50, and thus significantly extending the life of the protective element 35.

An important advantage of providing the central working portion 48 to be of a resilient deformable material and to be of dish shape with the first major surface 52 being convex when the central working portion 48 is in the relaxed state, is that when the central working portion 48 is deformed into the planar state by the action of the output face 25 of the ultrasonic transducer 19 thereon, the central working portion 48 is resiliently biased into tight abutting engagement with the output face 25 of the ultrasonic transducer 19, thereby minimising the attenuating effect of the protective element 35 on the signals transmitted or received by the ultrasonic transducer 19 through the protective element 35.

The advantage of providing the protective element to form a base of the sub-housing whereby the protective element 35 defines with the cylindrical side wall of the sub-housing the chamber 44 is that the protective element 35 and the cylindrical wall 40 may be sized and shaped to form the chamber 44 to tightly engage and accommodate the ultrasonic transducer 19 therein, and thereby protect the ultrasonic transducer.

In this embodiment of the invention the lower part 5 of the main housing 3 is also formed of a material which is resistant to the corrosive, hazardous or other environment within the vessel, the level of the contents within which is to be monitored, since at least the tubular member 27 of the lower part 5 of the main housing 3 will extend into the vessel. In this embodiment of the invention the lower part 5 of the housing is also formed in one piece by injection moulding from polyvinylidene fluoride or polyvinylidene difluoride. Although, the lower part 5 of the main housing 3 may be formed of other suitable materials, for example, mylar, or other materials capable of protecting against the relevant environment. The upper part (not shown) of the main housing 3 may be formed from any suitable material, since it will not be in contact with the corrosive, hazardous or other environment within the vessel.

To assemble the level sensor 1, the sub-housing 39 with the protective element 35 in one piece, either formed in one piece as already described or with the protective element 35 secured to the sub-housing 39, is inserted into the engagement recess 17 of the lower part 5 of the main housing 3. The sub-housing 39 and the protective element 35 are urged into the engagement recess 17 until the protective element, and in particular the second major surface 55 of the outer peripheral portion 49 is in tight abutting engagement with the base 22 of the engagement recess 17. At this stage, the outer peripheral portion 49 is supported on the base 22 of the engagement recess 17. The first major surface 52 of the central working portion 48 and the flexion zone 50 are coated with a thin film of a suitable couplant gel to assist in mechanical coupling between the first major surface 52 of the central working portion 48 and the output face 25 of the ultrasonic transducer 19.

A suitable adhesive is coated onto the ribs 42 and the outer surface of the sleeve 41 of the ultrasonic transducer 19, so that when the ultrasonic transducer 19 is urged into the chamber 44 of the sub-housing 39, the ultrasonic transducer 19 will be securely bonded to the cylindrical side wall 40 by the sleeve 41. With the adhesive coated onto the sleeve 41 of the ultrasonic transducer 19, the ultrasonic transducer 19 is urged into the chamber 44 until the output face 25 of the ultrasonic transducer 19 is in tight abutting engagement with the central working portion 48 of the protective element 35 and the central working portion 48 has been deformed into a planar configuration. At this stage the assembly of the ultrasonic transducer 19, the sub-housing 39 together with the protective element 35 into the lower part 5 of the main housing 3 has been completed.

The ultrasonic transducer 19 is then connected to the control circuitry located in the compartments 34 of the lower portion 5 of the main housing 3. The upper part 6 of the main housing 3 is then secured to the lower part 5 of the main housing 3 by screws (not shown) extending through the bores 16 in the upper part 6 engaging the threaded bores 14 in the outer cylindrical side wall 9 of the lower part 5. The level sensor 1 is ready to be inserted into a vessel typically, through a sensor accommodating bore in an upwardly facing wall of the vessel as will be well understood by those skilled in the art with the tubular member 27 extending through the sensor accommodating bore in the upwardly facing wall in the vessel.

In use, the level sensor 1 is secured to a top wall of the vessel, the level of the contents within which are to be monitored, with at least the tubular member 27 extending downwardly into the vessel through a suitable sensor accommodating opening in the vessel. Thereafter, if the level sensor 1 is configured for wireless communication, no further action is required. On the other hand, if the level sensor 1 is to be hardwired to suitable remote control apparatus, the control circuitry within the main housing 3 is connected by a cable extending through a suitable access opening (not shown) in either the upper part 6 or the lower part 5 of the main housing 3 for electrically connecting the control circuitry of the level sensor 1 to the remote control apparatus. A suitable cable seal is provided in the access opening sealing the cable in the access opening into the main hollow interior region 12 of the main housing 3.

While the protective element 35 has been described as being supported in a support structure comprising the sub-housing 39 which comprises the cylindrical side wall 40, it is envisaged in some embodiments of the invention that the support structure may be omitted, and the protective element would be secured in the engagement recess 17 with the outer peripheral portion and the flexion zone abutting the base 22 of the engagement recess 17. Typically, a securing ring which would substantially form an interference fit with the inner cylindrical side wall 20 of the engagement recess 17 would be urged into the engagement recess 17 for tightly retaining the protective element 35 in the engagement recess 17 adjacent the base 22 thereof with the outer peripheral portion 49 of the protective element 35 clamped tightly between the base 22 and the securing ring with the flexion zone 50 free of the securing ring. Alternatively, it is envisaged that in some embodiments of the invention the protective element may be integrally formed with the lower part 5 of the main housing 3 during the formation of the lower part 5, for example, by injection moulding, and would typically extend across the communicating aperture 24 sealably closing the communicating aperture 24.

It is also envisaged that in some embodiments of the invention the lower part 5 of the main housing 3 could be over-moulded on the sub-housing 39, including the protective element 35, and in which case, the sub-housing comprising the peripheral cylindrical side wall 40 and the protective element 35 may be preformed integrally in one piece, or the protective element 35 may be formed separately of the peripheral cylindrical wall 40 of the sub-housing and subsequently secured together prior to over-moulding of the lower part 5 of the main housing 3.

While the protective element has been described as comprising an outer peripheral portion of thickness greater than the thickness of the central working portion 48, in some embodiments of the invention the outer peripheral portion 49 may be of the same thickness as that of the central working portion 48, and in other embodiments of the invention it is envisaged that the outer peripheral portion of the protective element may be omitted. Further, it is envisaged that in some embodiments of the invention the flexion zone 50 may also be omitted, and the central working portion 48 would be connected directly to the outer peripheral portion 49, and if the outer peripheral portion 49 is of thickness greater than the thickness of the central working portion 48, it is envisaged that the first major surface of the outer peripheral portion 49 would transition into the first major surface 52 of the central working portion 48 by a transitioning step. Ideally, the transitioning step should be inclined, and typically, should be inclined to diverge outwardly from the first major surface 52 of the central working portion 48 to the first major surface 54 of the outer peripheral portion 49, although, in some embodiments of the invention the transitioning step may be perpendicular to both first major surfaces 52 and 54.

It is also envisaged that where the protective element is provided with a flexion zone, the thickness of the flexion zone may be different to the thickness of the central working portion, and may be of greater or lesser thickness than that of the central working portion.

While the protective element has been described as being of polyvinylidene fluoride, it will be appreciated that other suitable materials which would be impermeable to the corrosive, hazardous or other environment from which the ultrasonic transducer is to be protected, may be used. It will also be appreciated that the thickness of the central working portion 48 of the protective element 35 may be of other suitable thicknesses, greater or less than 0.35 mm, and in some embodiments of the invention the thickness of the central working portion 48 of the protective element may lie in the range of 0.01 mm to 1 mm.

While the diameter of the central working portion 48 of the protective element 25 has been described as being 8 mm, it is envisaged that the diameter of the central working portion 48 of the protective element may be of any suitable diameter, and typically, the diameter of the central working portion 48 of the protective element will be dictated by either or both the diameter of the output face 25 of the ultrasonic transducer and/or the diameter of the communicating aperture 24.

Additionally, while the flexion zone 50 of the protective element 35 has been described as being partly supported on the base 22 of the engagement recess 17, in some embodiments of the invention, it is envisaged that the flexion zone 50 may remain unsupported, and would overlie the communicating aperture 24.

While the protective element, as well as the central working portion and the outer peripheral portion thereof and the flexion zone have been described as being of circular shape, the protective element together with the central working portion, the outer peripheral portion and the flexion zone may be of any other suitable shape, and their shape, in general, will be dictated by the shape of the output face 25 of the ultrasonic transducer 19.

Additionally, while the central working portion 48 and the flexion zone have been described in their relaxed state as being convex when viewed from the side of the first major surface 52 thereof, it is envisaged that in some embodiments of the invention the central working portion and the flexion zone may be planar in the relaxed state thereof, and where the central working portion and the flexion zone are convex in the relaxed state thereof when viewed from the first major surface, the ratio of the convexity of the first major surface thereof to the outer diameter of the flexion zone may be greater or less than 1:33.

It is also envisaged that in some embodiments of the invention the ultrasonic transducer may be located in the chamber of the sub-housing 39 such that when the output face 25 of the ultrasonic transducer 19 is urged into abutment with the central working portion 48 of the protective element 35, the central working portion 48 may only part deform, so that only a central portion of the central working portion 48 would be planar. An advantage of this would be that any condensation which might form on the output face of the transducer or on the first major surface of the central working portion of the protective element would run off towards the peripheral edge of the central working portion thereby reducing any attenuating effect of such condensation on the transmission of signals through the protective element.

While the lower part 5 of the main housing has been described as being of a specific material or materials, it will be readily apparent to those skilled in the art that the lower part of the main housing may be of any other suitable material. However, it is envisaged that those parts of the lower part of the main housing which project into the vessel, the level of the contents of which is being monitored by the ultrasonic level sensor 1, and which would be in contact with any corrosive or hazardous gases, vapours or other corrosive or hazardous media, would be of a material resistant to such corrosive or hazardous gases, vapours or other media.

It will also be appreciated that while the lower part of the main housing has been described as being formed by a specific forming process, the lower part of the main housing may be formed by any other suitable process.

Additionally, while in general, it is envisaged that the upper part of the main housing will not be in contact with corrosive or hazardous gases, vapours or other media in the vessel, the upper part of the main housing may be of a different material to the material of the lower part, and the upper part thereof may, for example, comprise any suitable plastics material. It will of course be appreciated that the upper and lower parts of the main housing may be of any suitable metal material, polymer material or other such suitable materials, which may be formed or fabricated by any suitable forming or fabricating process.

The invention claimed is:
1. An ultrasonic distance sensor comprising:
a main housing for housing an ultrasonic transducer therein, the main housing having a communicating aperture for accommodating a transmitted signal from the ultrasonic transducer therethrough, and a protective element protecting the ultrasonic transducer from a corrosive or hazardous environment into which the signal from the ultrasonic transducer is to be transmitted, the protective element comprising:
   a central working portion having a first major surface and a second major surface opposite the first major surface, the first major surface being adapted to abut an output face of the ultrasonic transducer,
   an outer peripheral portion extending around the central working portion and having a first major surface and a second major surface opposite the first major surface thereof, the second major surface of the outer peripheral portion being engageable with the main housing adjacent the communicating aperture thereof with the protective element sealably closing the communicating aperture, wherein
   the first major surface of the central working portion in a relaxed state thereof is convex, and the central working portion is of a deformable resilient material, and is deformable from the relaxed state in response to pressure applied to the first major surface for reducing the convexity thereof to a substantially planar first major surface with the substantially planar first major surface of the central working portion being resiliently urged into tight abutting engagement with the output face of the ultrasonic transducer,
   the central working portion being of thickness between the first and second major surfaces thereof less than the thickness of the outer peripheral portion between the first and second major surfaces thereof, and transitioning into the outer peripheral portion through a flexion zone extending around the central working portion between the central working portion and the outer peripheral portion to permit flexing of the central working portion relative to the outer peripheral portion during transmission of the signal from the ultrasonic transducer so that the central working portion vibrates with the output face of the ultrasonic transducer to minimize the attenuating effect of the protective element on the transmitted signal from the ultrasonic transducer.

2. An ultrasonic distance sensor as claimed in claim 1, wherein the maximum attenuating effect of the protective element on the transmitted signal lies in the range of 5% to 30% of the strength of the transmitted signal.

3. An ultrasonic distance sensor as claimed in claim 1, wherein the central working portion of the protective element comprises a resiliently bendable disc.

4. An ultrasonic distance sensor as claimed in claim 1, wherein the ratio of the depth of convexity of the first major surface of the central working portion of the protective element in the relaxed state between the centre of the first major surface of the central working portion of the protective element and the outer peripheral edge of the first major surface of the central working portion to the maximum width dimension of the central working portion through the centre thereof lies in the range of 1:70 to 1:33.

5. An ultrasonic distance sensor as claimed in claim 1, wherein the central working portion of the protective element is of substantially constant thickness.

6. An ultrasonic distance sensor as claimed in claim 1, wherein the flexion zone is adapted to permit the central working portion of the protective element to vibrate in unison with the output face of the ultrasonic transducer during transmission of the ultrasonic signal therefrom.

7. An ultrasonic distance sensor as claimed in claim 1, wherein the flexion zone defines a first major surface and an opposite second major surface, the second major surface of the flexion zone lying in a common plane with the second major surface of the central working portion of the protective element, when the first major surface of the central working portion of the protective element is planar.

8. An ultrasonic distance sensor as claimed in claim 1, wherein the second major surface of the outer peripheral portion of the protective element lies in a common plane with the second major surface of the central working portion of the protective element when the second major surface of the central working portion is planar.

9. An ultrasonic distance sensor as claimed in claim 7, wherein the first major surface of the outer peripheral portion of the protective element transitions into the first major surface of the flexion zone through a transition step extending circumferentially around and from the first major surface of the outer peripheral portion.

10. An ultrasonic distance sensor as claimed in claim 1, wherein a support structure is provided for supporting the protective element, the support structure comprising a sub-housing engageable with the main housing.

11. An ultrasonic distance sensor as claimed in claim 10, wherein the sub-housing defines with the protective element a chamber for accommodating the ultrasonic transducer therein.

12. An ultrasonic distance sensor as claimed in claim 10, wherein the main housing defines an engagement recess for accommodating the sub-housing therein, the engagement recess terminating in the communicating aperture.

13. An ultrasonic distance sensor as claimed in claim 1, wherein the area of the central working portion of the protective element is substantially similar to the area of an output face of the ultrasonic transducer from which the ultrasonic signals are transmitted.

14. An ultrasonic distance sensor as claimed in claim 1, wherein the protective element comprises a material impermeable to the corrosive or hazardous environment into which the signal from the ultrasonic transducer is to be transmitted.

15. A protective element for use in the ultrasonic distance sensor as claimed in claim 1 in which the protective element is adapted to protect the ultrasonic transducer thereof from a corrosive or hazardous environment into which a signal from the ultrasonic transducer is to be transmitted.

16. An ultrasonic distance sensor as claimed in claim 1, wherein the central working portion of the protective element is of thickness between the first and second major surfaces thereof in the range of 0.01 mm to 1 mm.

17. An ultrasonic distance sensor as claimed in claim 7, wherein the first major surface of the flexion zone of the protective element lies in a common plane with the first major surface of the central working portion when the first major surface of the central working portion is planar.

18. An ultrasonic distance sensor as claimed in claim 9, wherein the transition step defines an inclined surface, inclining relative to the first major surface of the outer peripheral portion.

19. An ultrasonic distance sensor as claimed in claim 18, wherein the transition step diverges outwardly from the first major surface of the flexion zone towards the first major surface of the outer peripheral portion at an angle to the first major surface of the flexion zone in the range of 100° to 150°.

20. A method for protecting an ultrasonic transducer of a distance measuring sensor, the distance measuring sensor comprising:

a main housing, and an ultrasonic transducer located in the main housing, the ultrasonic transducer having an output face through which an ultrasonic signal is transmitted,     the main housing having a communicating aperture therein for accommodating a transmitted signal from the ultrasonic transducer therethrough, the method comprising:

providing a protective element protecting the ultrasonic transducer from a corrosive or hazardous environment into which the signal from the ultrasonic transducer is to be transmitted,     providing the protective element with a central working portion having a first major surface and a second major surface opposite the first major surface,     providing an outer peripheral portion extending around the central working portion, the outer peripheral portion having a first major surface and a second major surface opposite the first major surface thereof,     locating the protective element in the housing with the outer peripheral portion engaging the housing and extending around the communicating aperture with the protective element sealably closing the communicating aperture, and with the first major surface of the central working portion abutting the output face of the ultrasonic transducer, wherein the method further provides:

providing the central working portion of a deformable resilient material with the first major surface of the central working portion being convex in a relaxed state thereof,     urging the output face of the ultrasonic transducer into engagement with the first major surface of the central portion to deform the central portion to reduce the concavity of the first major surface thereof to a substantially planar first surface so that the first major surface of the central working portion is urged into tight resilient abutting engagement with the output face of the transducer,     providing the central working portion between the first and second major surfaces thereof to be of thickness less than the thickness of the outer peripheral portion between the first and second major surfaces thereof, and     providing the central working portion to transition into the outer peripheral portion through a flexion zone extending around the central working portion between the central working portion and the outer peripheral portion to permit flexing of the central working portion relative to the outer peripheral portion thereof during transmission of the signal from the ultrasonic transducer so that the central working portion vibrates with the output face of the ultrasonic transducer to minimize the attenuating effect on the transmitted ultrasonic signal from the ultrasonic transducer.

* * * * *